United States Patent [19]
Holland et al.

[11] Patent Number: 5,152,556
[45] Date of Patent: Oct. 6, 1992

[54] HIGH TEMPERATURE TUBING JOINT WITH THREADED, SPLIT COLLAR

[75] Inventors: Richard Holland, Philo; H. O. Davis, Alameda; Stephen Tan, Albany, all of Calif.

[73] Assignee: Kaiser Aerospace and Electronics Corporation, Foster City, Calif.

[21] Appl. No.: 632,886

[22] Filed: Dec. 24, 1990

[51] Int. Cl.⁵ .................................. F16L 15/00
[52] U.S. Cl. ............................... 285/353; 285/373; 285/246; 285/322; 285/34; 285/243; 285/382.1; 285/357
[58] Field of Search ............... 285/353, 373, 419, 246, 285/322, 34, 243, 384, 385, 391, 392, 382.1, 382.2, 357, 348, 302

[56] References Cited
U.S. PATENT DOCUMENTS

| | | | |
|---|---|---|---|
| 604,224 | 5/1898 | Bennik | 285/34 |
| 1,283,554 | 11/1918 | Pillig | 285/373 |
| 2,080,271 | 6/1936 | Hirst | 285/348 X |
| 2,210,340 | 5/1939 | Reinhardt | 285/419 X |
| 2,366,341 | 2/1944 | Lappin | 285/34 X |
| 3,041,088 | 6/1962 | Brandon, Jr. | 285/33 |
| 3,224,795 | 12/1965 | Conley | 285/114 |
| 3,352,575 | 11/1967 | Daspit | 285/45 |
| 3,488,072 | 7/1968 | Allen et al. | 285/353 |
| 4,095,826 | 6/1978 | Borradori | 285/330 |
| 4,159,132 | 6/1979 | Hitz | 285/39 |
| 4,226,164 | 10/1980 | Carter | 285/33 |
| 4,236,736 | 12/1980 | Anderson | 285/150 |
| 4,470,609 | 9/1984 | Poe | 285/334.2 |
| 4,613,161 | 9/1986 | Brisco | 285/18 |
| 4,649,960 | 3/1987 | Policelli | 285/149 X |
| 4,871,196 | 10/1989 | Kingsford | 285/348 X |

Primary Examiner—Randolph A. Reese
Assistant Examiner—Timothy Aberle
Attorney, Agent, or Firm—Townsend and Townsend

[57] ABSTRACT

A connector system for joining a male tube to a female tube comprises an axially-split nut which extends across the region being joined. The female tube is externally threaded and mates with internal threads on one end of the axially-split nut. A shoulder formed in the other end of the axially-split nut engages a retaining ring formed on the male tube. A compressible seal ring is disposed between the end of the female tube and a second shoulder of the retaining ring. An external nut is placed over the axially-split nut to hold the entire assembly together and provide a radially compressive force on the seal ring. An axially compressive force can be provided by turning the female tube to draw the female and male tubes closer together.

13 Claims, 2 Drawing Sheets

HIGH TEMPERATURE TUBING JOINT WITH THREADED, SPLIT COLLAR

BACKGROUND OF THE INVENTION

1. Field of the Invention

The present invention relates generally to connectors for joining butting tubing elements, more particularly to a system for forming high temperature, high pressure joints between adjacent open-ended tubes, particularly tubes formed from composite materials.

The formation of butt joints in open-ended tubing is problematic, particularly when the joint must withstand high working temperatures and pressures. Problems are exacerbated when the tubing is formed from materials which have a relatively low thread (shear) strength, such as plastic, ceramic, and/or carbon-carbon composites, which makes the formation of conventional threaded connections impractical. While compressible seals, such as O-ring seals, can be utilized to improve the sealing characteristics of the joint, composite materials are frequently not sufficiently strong to provide the desired compression of the seal ring when using conventional threaded end connectors. The O-ring materials generally used do not provide seals at high temperatures, i.e., above 500° F.

It would therefore be desirable to provide connector designs, systems, and apparatus suitable for joining all types of open-ended tubing and pipes together. The connectors should be relatively simple to manufacture and to implement, and should be suitable for fabrication from most or all types of materials, including composite materials. It would be particularly desirable if the connectors could provide high strength coupling between tubes formed from materials possessing relatively low thread (shear) strength, even when all elements of the connector are formed from the same material. The connectors should include a compressible seal element between the tubes being joined and should be able to provide sufficient compressive (tightening) force to form an effective seal, even against high temperature and pressure. Preferably, the connectors should provide both axial and radial compression of the seal to provide for highly efficient joining of the separate tubing elements.

2. Description of the Background Art

Axially-split connecting structures having internal threads are disclosed in U.S. Pat. Nos. 4,236,736; 4,095,826; 3,352,575; and 1,283,554. The structure of the U.S. Pat. No. 4,095,826 is particularly intended for joining rigid plastic pipes. U.S. Pat. Nos. 4,613,161; 4,226,164; 4,159,132; 3,224,795; and 3,041,088, describe other systems for joining open-ended tubes together.

SUMMARY OF THE INVENTION

The present invention provides a connector system suitable for joining a male tube end to a female tube end. The male tube includes a retaining ring spaced a short distance away from its end, and a sealing ring received over its exterior. The sealing ring is axially compressed between the retaining ring and the female tube end as the two tube ends are drawn together. A means is provided for the simultaneous radial compression of the sealing ring in order to enhance the strength of the seal while placing a reduced stress on the components of the connector system.

In a preferred aspect of the present invention, a means for drawing the male tube into the female tube includes external threads on the female tube end and an internally-threaded axially-split nut. The axially-split nut includes an internal shoulder capable of engaging the retaining ring of the male tube, and after assembly the female tube can be axially tightened against the internal threads of the split nut. Excessive tightening of the tubes in the axial direction is not necessary since a separate means is provided for radially compressing the seal element in order to enhance the seal.

The means for radially compressing the seal ring will usually comprise an external nut which can be tightened over external threads formed on the axially-split nut. Usually, the external nut will be tapered to increase the radial force as the external nut is tightened. By properly balancing the axial compression and radial compression of the compressible seal, a very strong joint can be obtained which can withstand even very high temperatures and pressures without applying excessive shear force to any of the joint components.

In a particularly preferred aspect, the tubes, retaining ring, axially-splitnut, and external nut will be formed from a single material, usually from a single composite material, more usually from a carbon-carbon composite material. The compressible seal will be formed from a suitable sealing material, such as grafoil, graphite string, graphite tape, and the like.

DESCRIPTION OF THE SPECIFIC EMBODIMENTS

The connector system and present invention is suitable for joining or coupling virtually any type of tubing or pipe, including those formed from metal, plastics, composites, or any other material which may be used for forming elongate lengths of tubing. The present invention is particularly advantageous for joining abutting ends of composite tubing where the relatively low shear strength of threads formed in the tubing material would limit the ability to form conventional joints. The size of the tubing is not critical, and the present invention can join very small tubes having diameters as low as about 0.125 inches as well as very large tubes having diameters as large as about 10 inches and greater.

Composite tubing is conventionally formed by rolling or otherwise shaping reinforcement fabric into a desired cylindrical geometry, impregnating the fabric with a desired matrix precursor material, and curing and optionally converting the impregnated matrix into the desired final matrix material. Depending on the nature of the composite being formed, the fabric may be preimpregnated with the matrix precursor and partially cured prior to shaping the resulting "pre-preg" into the desired final geometry. The shape "pre-preg" can then be further cured and optionally densified according to well known techniques. For ceramic and carbon-carbon composites, the impregnate will typically be in the form of an organic or inorganic liquid precursor which is cured and subsequently converted to the desired matrix, typically by pyrolysis. Methods for forming tubing from composite materials are well known and well described in the patent and technical literature.

Particularly preferred methods for forming composite tubing suitable for use in the present invention are described in U.S. Pat. Nos. 4,741,873; 4,837,230; and 4,963,301, and copending patent application Ser. Nos. 07/166,958 and 07/433,946, now U.S. Pat. No. 4,983,422, the disclosures of which are incorporated herein by reference. The present invention is particularly suitable for joining tubing ends formed from the same composite material, and usually all components of the connectors system in the present invention (with the exception of the compressible seal ring as described in more detail hereinbelow) will be formed from the same composite material. In the preferred example of the present invention, all components are formed from a carbon-carbon composite material.

Figure 1:
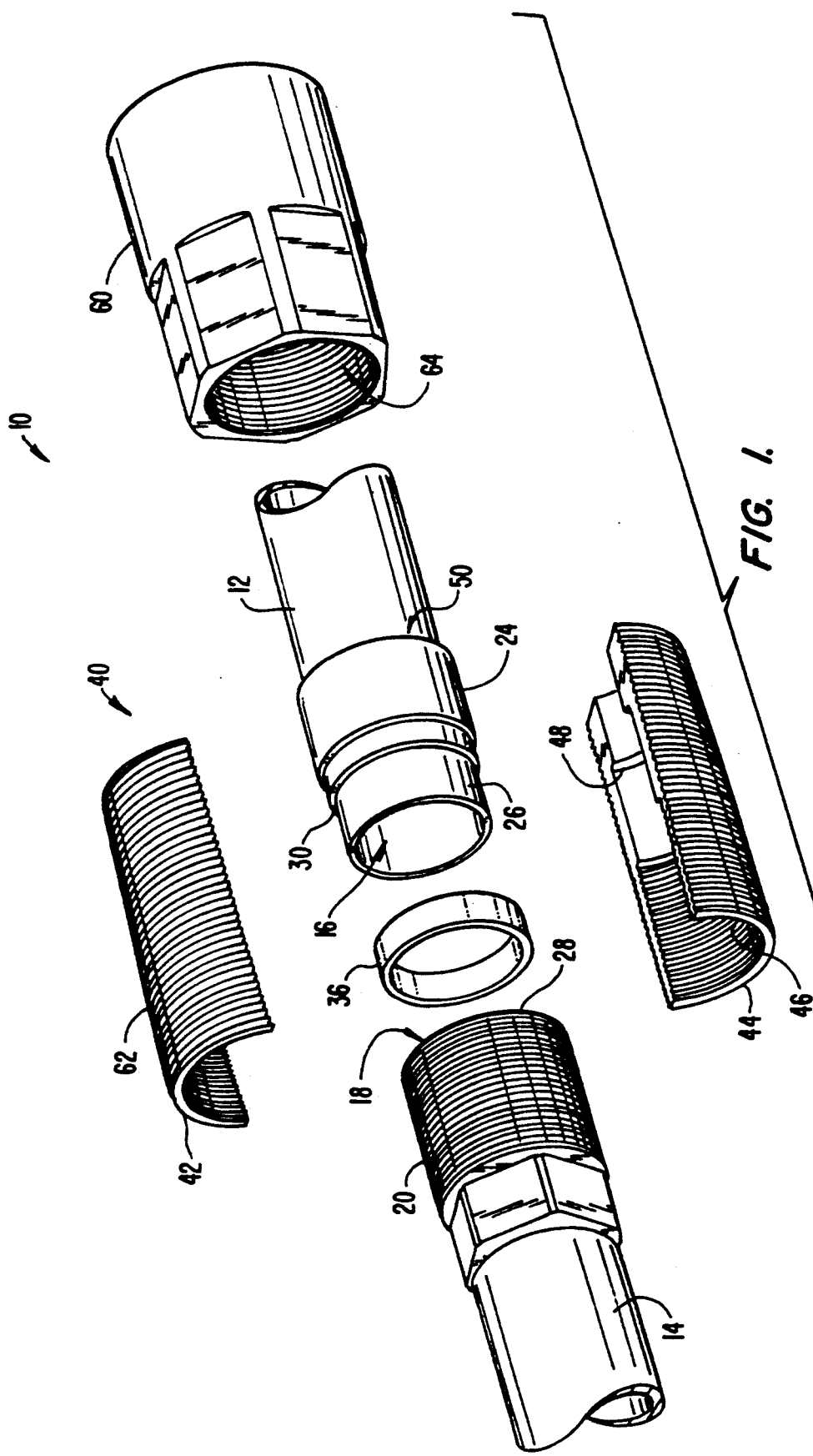
FIG. 1 is an exploded view illustrating the various components of a preferred embodiment of the present invention.
Figure 2:
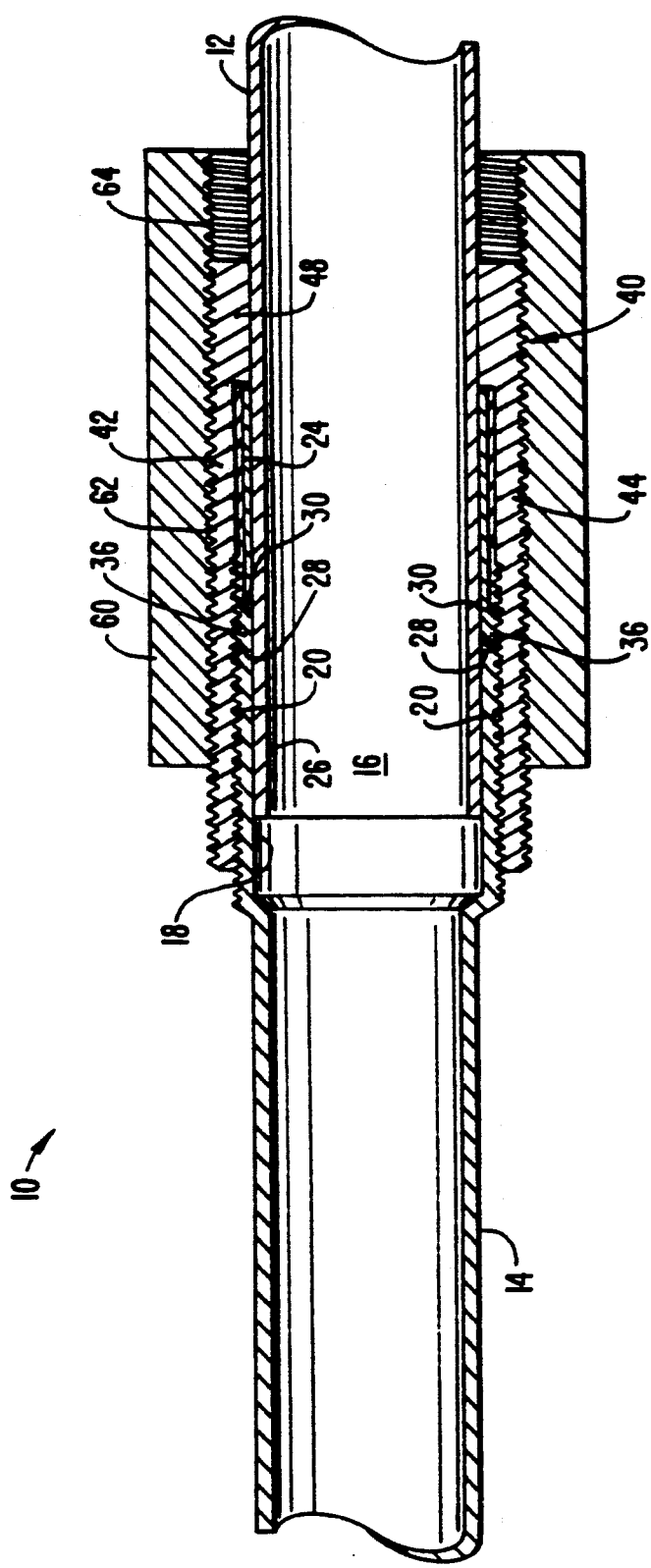
FIG. 2 is a side view of a joint formed from the components illustrated in FIG. 1, shown in cross-section.

Referring now to FIGS. 1 and 2, a connector system 10 according to the principals of the present invention includes a male tube 12 and a female tube 14. The male tube 12 has an open and distal end 16 which is slidably received within an open distal end 18 of the female tube 14. Usually, the clearance between the exterior of male tube 16 and the interior end 18 of female tube 14 will be small in order to improve the eventual joint which is formed. Sufficient clearance should be provided, however, so that the tubes can slide together without undue effort. The diameter of the remaining lengths of both male tube end 12 and female tube 14 may differ from that proximate the open ends 16 and 18, respectively, and typically the interior diameter of the female tube 14 will be reduced to match that of the male tube 16, as illustrated in FIG. 2.

External threads 20 are formed at the distal end of female tube 14, with the diameter, pitch, and length of the threads being chosen to be compatible with threading on the remaining components of the connector system, as described in more detail hereinafter.

A retaining ring 24 is fixedly attached near the distal end 16 of male tube 12. The retaining ring 24 will be spaced away from the distal tip, however, to leave an exposed insertional region 26 which will be received within the open end 18 of female tube 14. The length of the insertional region 26 is not critical, but it should not be so long that it prevents contact between the leading edge 28 of the female tube 14 and a first shoulder 30 of the retaining ring 24. The retaining ring 24 may be formed during fabrication of the male tube 12 or may be separately formed and attached thereafter, e.g., using adhesives.

A compressible seal ring 36 is sized to fit over distal end 16 of male tube 12 and to be able to slide and contact the shoulder 30. The female tube 14 is placed over the end of male tube 12, and the leading edge 28 may be brought into contact with the seal ring 36 so that the seal ring is trapped between the leading edge 28 and the shoulder 30. In this way, by drawing tubes 12 and 14 together (as described in more detail hereinafter), the seal ring 36 may be axially compressed. The seal ring 36 may be formed from any suitable deformable material commonly used in forming joint seals. For high temperature and locations, seal materials such as grafoil, graphite string, graphite tape, and the like, are preferred.

An axially-split nut 40 comprising a first half 42 and a second half 44 is sufficiently long to extend over the retaining ring 24 and the threaded end portion 20 of female tube 14 after the male and female tubes 12 and 14, respectively, are brought together, as illustrated in FIG. 2. The axially-split nut 40 includes internal threads 46 capable of engaging threads 20 on the female tube 14 and further includes an internal shoulder 48 capable of engaging a second shoulder 50 formed on the retaining ring 24. In this way, by placing both halves 42 and 44 of the axially-split nut 40 over the male and female tubes 12 and 14 so that the threads 46 engage threads 20 on the female tube and the shoulder 48 engages the second shoulder 50 on the retaining ring 24, the tubes may be axially tightened by turning the female tube. Tightening of the tubes in this manner will cause axial compression of the seal ring 36.

An external nut 60 is provided for clamping the two halves 42 and 44 of the axially-split nut 40 together. The nut 40 includes external thread 62 which are engaged by internal threading 64 within external nut 60. Preferably, the thread 62 on nut 40 are tapered and have an increasing diameter in the direction toward the female tube so that tightening of external nut 60 will provide a progressively larger clamping force on the two halves 42 and 44 of the axially-split nut 40. Not only does the clamping force uphold the assembly together, it also provides for a radially compressive force on the sealing ring 36 which is trapped between the female tube 14 and retaining ring 24.

By properly balancing the axially compressive force provided by tightening the female tube 14 against the male tube 12 and the radially compressive force provided by tightening the external nut 60, the seal provided by sealing ring 36 can be optimized without over stressing any of the components of the connector system 10.

Although the foregoing invention has been described in detail for purposes of clarity of understanding, it will be obvious that certain modifications may be practiced within the scope of the appended claims.

What is claimed is:

1. A system for joining a male tube end to a female tube end, said system comprising:
 a retaining ring fixedly attached about the exterior of the male tube at a location spaced-away from its end;
 a compressible seal placed over the end of the male tube and positioned between the end of the female tube and the retaining ring;
 means for applying an axial force against the retaining ring to draw the male tube end into the female tube end and to axially compress the compressible seal between the female tube end and the retaining ring said means for applying including an axially-split nut; and
 means for radially compressing the compressible seal.

2. A system as in claim 1, wherein the means for applying an axial force against the retaining ring includes:
 external threads formed on the female tube end; and wherein the axially-split nut has internal threads which mate with the external threads on the female tube end and an internal shoulder which engages the retaining ring, whereby tightening of the female tube against the internal threads of the axially-split nut will draw the male tube end into the female tube end and axially compress the compressible seal, wherein the means for radially compressing the compressible seal includes means for clamping the axially-split nut together.

3. A system as in claim 2, wherein the means for clamping includes:
 external threads formed on the axially-split nut; and a compression nut which is received on the external threads of the axially-split nut.

4. A system as in claim 3, wherein the external threads on the axially-split nut are tapered so that radial compression of the compressible seal is enhanced as the compression nut is tightened.

5. A system as in claim 1, wherein the compressible seal is composed of a material selected from the group consisting of grafoil, graphite string, and graphite tape.

6. A system as in claim 1, wherein all elements except the seal are composed of a composite material.

7. A system as in claim 6, wherein the composite is a carbon-carbon composite.

8. A tube connection system:
- a female tube having an externally threaded open end;
- a male tube having an open end which is sized to be slidably received in the open end of the female tube;
- a retaining ring fixed on the exterior of the male tube at a position spaced-away from its open end, said retaining ring having a first shoulder proximate said open end and a second shoulder away from said open end;
- a compressible seal ring sized to fit over the open end of the male tube and about the first shoulder of the retaining ring;
- an axially-split nut having internal threads which mate with the threaded end of the female tube, an internal shoulder which engages the second shoulder of the retaining ring, and external threads; and
- a compression nut which is received on the external threads of the axially-split nut, whereby the seal may be axially compressed by tightening the female tube against the internal threads of the axially-split nut and radially compressed by tightening the compression nut against the external threads of the axially-split nut.

9. A tube connection system as in claim 8, wherein the external threads on the axially-split nut are tapered so that radial compression of the compressible seal is enhanced as the compression nut is tightened.

10. A tube connection system as in claim 8, wherein the first shoulder of the retaining ring has a stepped profile.

11. A tube connection system as in claim 8, wherein the compressible seal is composed of a material selected from the group consisting of grafoil, graphite string, and graphite tape.

12. A tube connection system as in claim 8, wherein all elements except the seal are composed of a composite material.

13. A tube connection system as in claim 12, wherein the composite is a carbon-carbon composite.

* * * * *